United States Patent
Cotter

[11] 3,786,467
[45] Jan. 15, 1974

[54] ALARM DETECTOR WITH INCREASED OPERATING RANGE

[75] Inventor: William L. Cotter, Beverly, Mass.

[73] Assignee: Alarmtronics Engineering, Inc., Newton, Mass.

[22] Filed: Mar. 22, 1972

[21] Appl. No.: 236,868

[52] U.S. Cl. ........ 340/258 A, 340/16 R, 340/258 B
[51] Int. Cl. ............................................ G08b 13/16
[58] Field of Search .................... 340/258 A, 258 B, 340/15, 16 R

[56] References Cited
UNITED STATES PATENTS

| | | | |
|---|---|---|---|
| 2,782,405 | 2/1957 | Weisz et al. | 340/258 A |
| 2,655,645 | 10/1953 | Bagno | 340/258 A X |
| 2,922,999 | 1/1960 | Carlin | 340/15 |
| 3,093,809 | 6/1963 | Watlington | 340/15 |

Primary Examiner—David L. Trafton
Attorney—David M. Driscoll

[57] ABSTRACT

In an ultrasonic alarm detector of the doppler detection type including a transmitter transducer and a receiver transducer, the improvement comprising a second transmitter transducer disposed remote from the detector and driven from the master oscillator at the detector. The second transmitter is preferably disposed at the limiting range of the alarm detector and is directed in the same direction as the transmitter transducer at the alarm detector thereby extending the operating range of the detector to up to twice the range attainable without the second transmitter transducer.

11 Claims, 3 Drawing Figures

PATENTED JAN 15 1974  3,786,467

ALARM DETECTOR WITH INCREASED OPERATING RANGE

RELATED APPLICATIONS

The subject matter of patent application Ser. No. 205,599, entitled Ultrasonic Alarm Circuit, filed Dec. 7, 1971 is hereby incorporated by reference herein. This copending application, which is discussed in more detail hereinafter, discloses an ultrasonic doppler detection circuit including a transmitter transducer and a receiver transducer. The incorporation of the copending application is in no way to be construed as limiting the appended claims of the present invention to the specific detector circuit disclosed and claimed therein.

FIELD OF THE INVENTION

The present invention pertains in general to an alarm system preferably disposed within a secured area for detecting the presence of an intruder in the secured area. More particularly, the present invention relates to a preferably ultrasonic doppler detection system including a remote transmitter transducer driven by an oscillator comprising in part the detection circuitry for the system and directed so as to extend the operating range of the system.

BACKGROUND OF THE INVENTION

In one embodiment of the alarm circuit disclosed in the copending application Ser. No. 205,599, the maximum range of detection in a secured area is about 30 feet. It would be advantageous to extend this detection range up to another 30 feet but known techniques for extending the range involve the expenditure of sufficient additional costs so that it is almost as easy to just provide two detectors for these larger areas to be secured. One known technique is to provide a second transmitter/receiver transducer arrangement and associated circuitry. This technique is generally too costly. The use of a single remote receiver transducer has also been tried but did not extend the detection range sufficiently to warrant its use. However, quite unexpectedly the placement of a transmitter transducer at about the limiting range of the basic detector directed preferably in the same direction as the transmitter transducer associated with the basic detector extended the detection range to twice the normal 30 feet range. Also, this extension of the range by the employment of the remote transmitter transducer added little cost to the basic detector.

OBJECTS OF THE INVENTION

Accordingly, it is a primary object of the present invention to provide an alarm detection system including a remote transmitter means for extending the detection range of the basic detector.

Another object of the present invention is to provide an improved alarm detection system in accordance with the primary object and that may be fabricated at only a small additional cost over the cost of the basic detector arrangement which includes both transmitter and receiver transducers.

A further object of the present invention is to provide an alarm detection system in accordance with the preceding objects wherein the addition of the remote transmitter transducer can be readily made to existing detectors with little added cost and with the need for only a few tie wires to the remote transmitter means.

SUMMARY OF THE INVENTION

To accomplish the foregoing and other objects of the present invention the alarm detection system comprises a basic detector generally including an oscillator or the like for generating an ultrasonic signal such as 26 K HZ signal, means for transmitting the ultrasonic signal to establish an ultrasonic wave pattern in the area to be secured, means for receiving the reflected ultrasonic signal, and means responsive to the transmitting means and the receiving means for registering a doppler signal of a frequency corresponding to the velocity of motion in the area. The latter means includes means for generating an alarm condition when an intruder motion is detected in the secured area.

The improvement in accordance with the present invention resides in the use of a second transmitter means preferably including a transmitter transducer disposed remotely from the transmitting means of the basic detector but excited from the oscillator at the basic detector. This remote transmitting means is disposed approximately at the limiting range of the basic detector and is directed toward the additional area to be secured so as to extend the detection range of the system to cover this additional area. In one embodiment the range of the basic detector is about 30 feet and the remote transmitting means is disposed about 30 feet from the basic detector and is directed in substantially the same direction as the transmitting means of the basic detector to thereby extend the detection range to approximately 60 feet from the basic detector. In another embodiment wherein the secured area includes an L-shaped area having two leg areas, the basic detector is disposed at one end of one leg area and the remote transmitting means is disposed at the junction area between the leg areas and directed toward the other leg area to, in effect, extend the detection range around a corner.

BRIEF DESCRIPTION OF THE DRAWINGS

Numerous other objects, features and advantages of the present invention will now become apparent upon a reading of the following detailed description taken in conjunction with the appended drawings in which.

DETAILED DESCRIPTION

Figure 1:
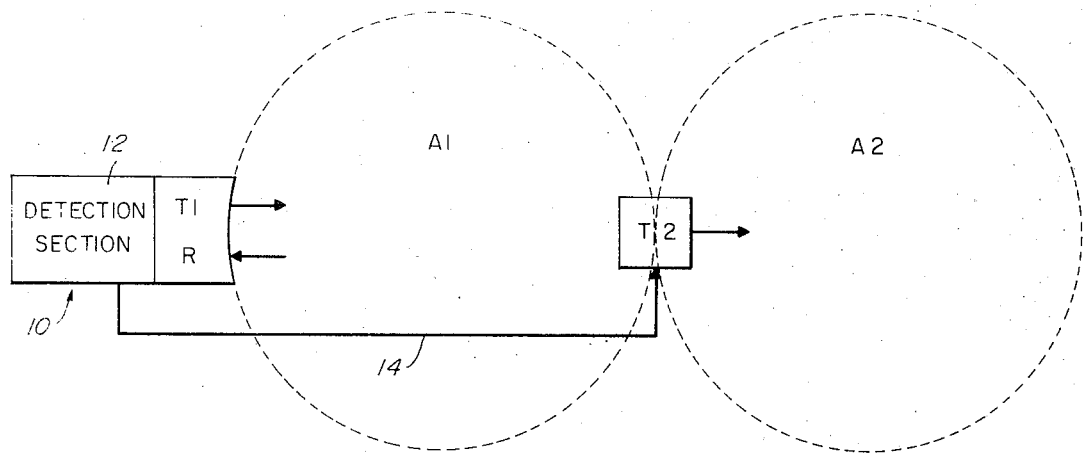
FIG. 1 is a schematic block diagram of one embodiment of the alarm detection system of the present invention.

Referring now to the drawings and in particular to the diagram of FIG. 1, there is shown an alarm detection system including a detector 10 of the ultrasonic doppler detection type which may be of conventional design. The detector includes a detection section 12, a transmitter transducer T1 and a receiver transducer R. The detector 10, when operating independently, excites transmitter transducer T1 to establish an ultrasonic wave pattern in the area A1, depicted as a dotted circle. The receiver transducer R receives the reflected ultrasonic signal and the detection section 12 registers a doppler signal of a frequency corresponding to the velocity of motion in area A1. Detection section 12 also includes means for generating an alarm when intruder motion is detected.

One ultrasonic alarm detector is disclosed in copending application Ser. No. 205,599, referred to hereinbefore. That detector is depicted in FIG. 1 of that application as including a transmitter transducer excited from an oscillator, a receiver transducer, a phase detector, time and frequency filter means and output alarm circuitry. There are also many other detector arrangements that may be employed in the present invention.

FIG. 1 also shows a remote transmitter means T2 disposed in the disclosed embodiment, at the edge of area A1 diametrically opposite detector 10. A tie line 14 couples from detector 10 to transmitter means T2 and this remote means is directed in substantially the same direction as is the transmitter transducer T1 of detector 10. With the remote transmitter means positioned as indicated in FIG. 1 the detection range of the detector 10 is extended into an additional area A2 which is about the same size as area A1. In one embodiment the distance from detector 10 to remote transmitter means T2 is 30 feet which is the approximate maximum range for the detector when operated independently, and the extended range (diameter of area A2) attained by use of remote means T2 is 30 feet. The remote transmitter means T2 may be placed at a distance less than the limiting range of the basic detector, but should preferably not be placed too far outside the area A1 or there will be a blind spot in the detection system.

Figure 2:
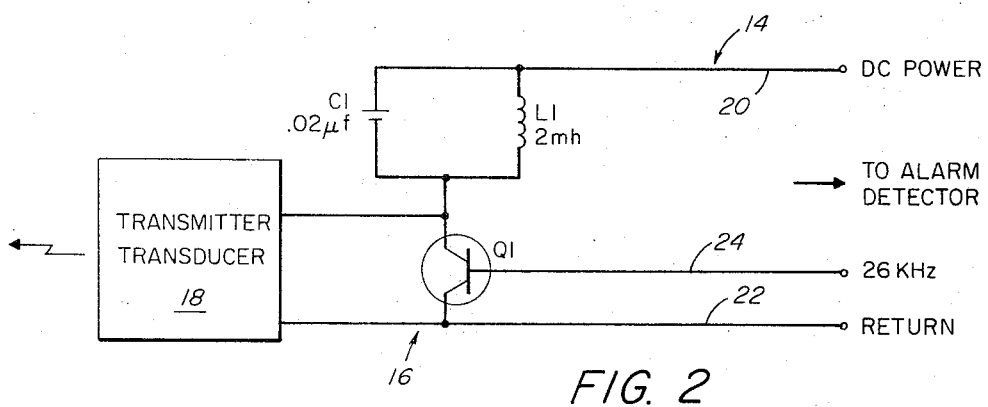
FIG. 2 is a partial circuit, partial block diagram of the remote transmitting means of the present invention shown in a block in FIG. 1.

Referring now to FIG. 2, there is shown one embodiment for the remote transmitter means T2 of FIG. 1 including the tie line 14 coupled from detector 10, a buffer circuit 16 and a remote transmitter transducer 18 which may, per se, be of conventional design. The tie line 14 includes three separate lines, namely; the DC power line 20, the return line 22 and the 26K Hz signal line 24. The buffer circuit includes a tuned tank circuit including capacitor C1 and inductor L1 which is resonant about 26 KHz, and transistor Q1. The 26 KHz signal from an oscillator of the detector 10 couples to the base electrode of transistor Q1. The emitter electrode of the transistor connects to the ground return line and the collector electrode couples to one side of the tank circuit. The other side of the tank circuit connects to line 20, thereby providing a biasing path for transistor Q1. The transmitter transducer 18 receives a signal input from the collector electrode of the transistor and an input from line 22. Transistor Q1 is a buffer amplifier and represents essentially no load to the oscillator at the main detector. The three conductor tie line 14 is preferably a shielded cable with the shield being grounded at both ends of the cable to provide low signal loss.

Figure 3:
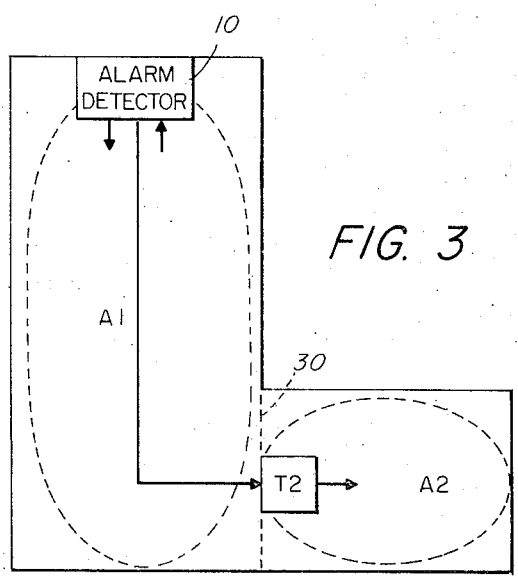
FIG. 3 is a schematic block diagram of another arrangement for the alarm detection system of the present invention for use in an L-shaped area.

FIG. 3 shows a schematic block diagram of another arrangement for the alarm detection system of the present invention. In this arrangement the secured area is L-shaped including a first area A1 having the detector 10 disposed at one end thereof and extending to approximately the limiting range (illustratively, 30 feet) of the detector, and a second area A2 extending at right angles to the longitudinal direction of area A1. Normally, without the use of the remote transmitting means T2 the intruder motion in area A2 cannot be detected. It has been found that by disposing the transmitter means T2 at about the junction line 30 between areas A1 and A2, the detection range of the detector 10 is extended about one half again the limiting range of the basic detector. Thus, if area A2 is no deeper than say 15 feet, intruder motion in area A2 can be detected by disposing transmitting means T2, as shown, and exciting it from the main oscillator of the detector. The transmitter means T2 may be the same configuration as depicted in FIG. 2.

One advantage to the system of the present invention is that the increased detection range can be obtained quite easily and inexpensively. Only a relatively simple circuit such as the one depicted in FIG. 2 is added to the basic detector along with a tie line.

Having described a limited number of embodiments of the present invention, numerous other embodiments and modifications thereof should now become apparent to one skilled in the art, and all such embodiments are contemplated as falling within the spirit and scope of the present invention. For example, only two configurations of areas to be secured have been considered herein. However, it is intended that other configurations shall fall within the scope of the present invention. For instance, if the secured area is cross-shaped two or more remote transmitting means may be employed, each directed toward a different area. Also, with respect to FIG. 1, if the secured area is not rectangular in shape but instead has an angular bend therein the remote transmitting means is not directed in exactly the same direction as the transmitting means of the basic detector but is at an angle thereto. It is important in each different secured area that the remote transmitting means be directed toward the additional area to be secured. Furthermore, it is expected that many different types of basic detectors can be employed in the present invention. Also, the remote transmitting means may have a different configuration than that shown specifically in FIG. 2.

What is claimed is:

1. In an alarm detection system for use in a secured area comprising a detector having means for generating an ultrasonic signal, first means for transmitting the ultrasonic signal to establish an ultrasonic wave pattern in the area, means for receiving the reflected ultrasonic signal, said first means for transmitting and said means for receiving being disposed at a first site, and means for registering a doppler signal of a frequency corresponding to the velocity of motion in the area including means for registering an alarm condition, the improvement comprising;

second means for transmitting an ultrasonic signal coupled from and responsive to said means for generating an ultrasonic signal, said second means for transmitting being disposed at a second site remote from the first transmitting means and directed so as to extend the detection range of said system, said means for registering a doppler signal capable of being responsive to said second means for transmitting, said first means for transmitting including a transmitter transducer, said means for receiving including a receiver transducer, and said second means for transmitting including a transmitter transducer, and means for coupling the ultrasonic signal to said second means for transmitting and including a multi-wire tie line.

2. The system of claim 1 wherein said second means for transmitting is disposed within the detection range of said detector when operated independently without said second means for transmitting connected.

3. The system of claim 2 wherein said second means for transmitting is disposed at about the maximum range of said detector to thereby extend the composite range to twice the original range.

4. The system of claim 1 wherein said buffer circuit includes a resonant circuit and amplifier means both coupled to said second transmitter transducer.

5. The system of claim 4 wherein said resonant circuit includes a tank circuit and said amplifier means includes a transistor coupled to said tank circuit.

6. The system of claim 5 wherein said tie line includes a power line, return line and signal line.

7. An Alarm detection system for use in an area to be secured comprising;
an oscillator for providing an ultrasonic signal,
first transmitting means including a first transmitter transducer for directing the ultrasonic signal into the secured area to establish an ultrasonic wave pattern in a first part of the secured area,
means for receiving the reflected ultrasonic signal,
said first transmitting means and said means for receiving being disposed at a first site,
means responsive to said first transmitting means and said means for receiving for registering a doppler signal of a frequency corresponding to the velocity of motion in the area including means for registering an alarm condition,
second transmitting means including a second transmitter transducer disposed at a second site remote from said first site and directed toward and having an operating range covering a second part of the secured area,
and means coupling said ultrasonic signal to said second transmitter transducer.

8. In an alarm detection system for use in a secured area, said system comprising first means for transmitting an ultrasonic signal to establish an ultrasonic wave pattern in the area, means for receiving the reflected ultrasonic signal, and means for registering a doppler signal of a frequency corresponding to the velocity of motion in the area the improvement comprising;
second means for transmitting an ultrasonic signal,
said first means for transmitting being disposed at a first site and having an operating range covering a first portion of the secured area,
said means for receiving being disposed at the first site,
said second means for transmitting being disposed at a second site remote from said first means for transmitting and directed toward and having an operating range covering a second portion of the secured area,
said means for registering being responsive to reflected signals from both said first and second means for transmitting.

9. The system of claim 8 wherein said second means for transmitting is disposed approximately at the limiting range of said first means for transmitting.

10. The system of claim 8 comprising conductive means for coupling the ultrasonic signal to said second transmitting means.

11. The system of claim 8 wherein said first means for transmitting is directed in a first direction and said second means for transmitting is directed in a second direction approximately orthogonal to said first direction.

* * * * *